United States Patent [19]
Ullom

[11] 3,872,578
[45] Mar. 25, 1975

[54] METHOD OF CONNECTING A ROTATING MEMBER TO A SHAFT

[75] Inventor: William L. Ullom, Wabash, Ind.

[73] Assignee: The Cyclone Seeder Company, Inc., Urbana, Ind.

[22] Filed: May 6, 1974

[21] Appl. No.: 466,997

[52] U.S. Cl................ 29/525, 72/470, 403/282, 403/359
[51] Int. Cl............................................ B23p 19/02
[58] Field of Search...... 29/432, 525; 403/282, 285, 403/359; 72/470

[56] References Cited
UNITED STATES PATENTS

| | | |
|---|---|---|
| 1,157,666 | 10/1915 | Bennett........................ 403/359 X |
| 1,775,055 | 9/1930 | Tarbax et al...................... 29/525 X |
| 1,996,128 | 4/1935 | Thomson ...................... 29/525 UX |
| 2,197,883 | 4/1940 | Sinclair.......................... 29/525 UX |
| 2,575,481 | 11/1951 | Anderson............................ 403/285 |
| 2,869,907 | 1/1959 | Deliso................................ 403/359 |
| 3,068,508 | 12/1962 | Heyer............................. 29/525 UX |
| 3,619,882 | 11/1971 | Sobanski et al................... 29/525 X |
| 3,734,697 | 5/1973 | Sieghartner....................... 29/525 X |

Primary Examiner—Charlie T. Moon
Attorney, Agent, or Firm—Oltsch & Knoblock

[57] ABSTRACT

A method in which raised ridges defining grooves are formed in the outer surface of a shaft by application of a compressive die applied impact force. An impeller, gear, rotor or similar component is connected to the shaft for rotation therewith through an interfitting fit with the raised ridges formed upon the shaft.

3 Claims, 6 Drawing Figures

PATENTED MAR 25 1975 3,872,578
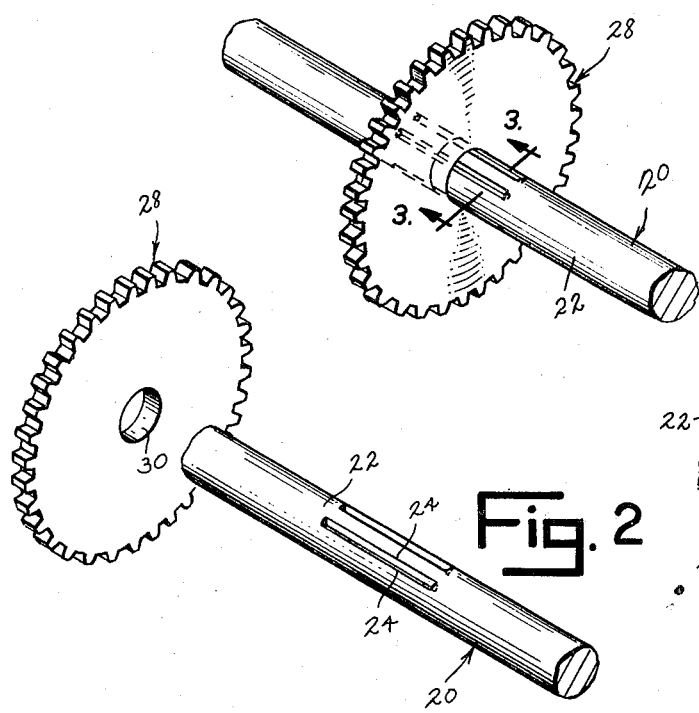
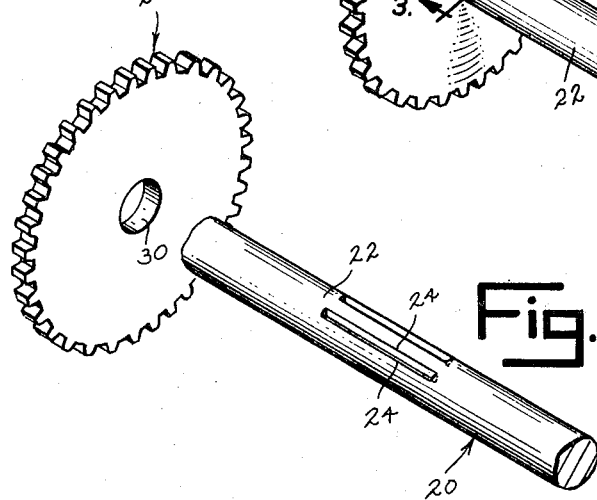
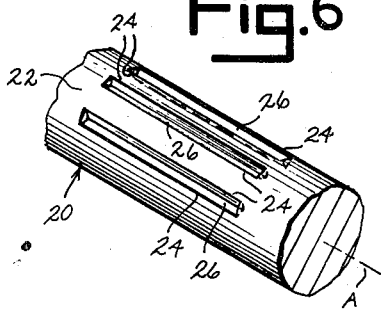
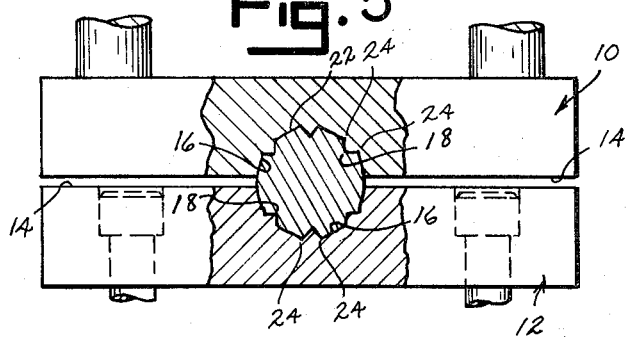
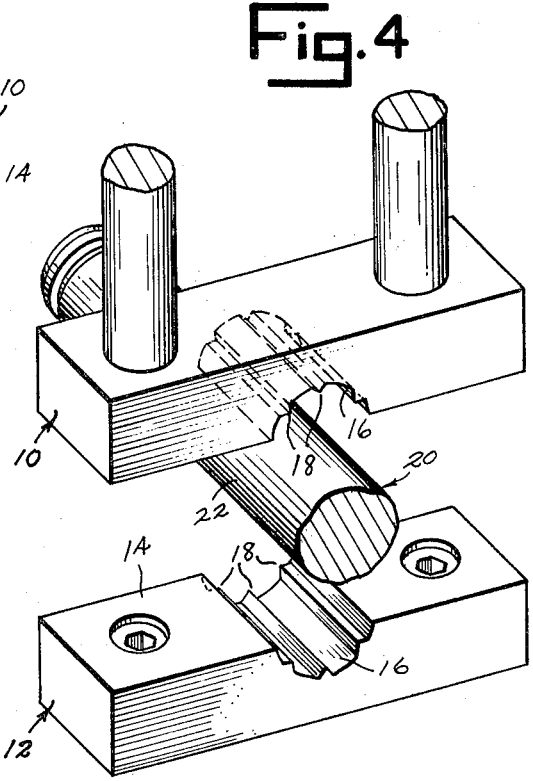
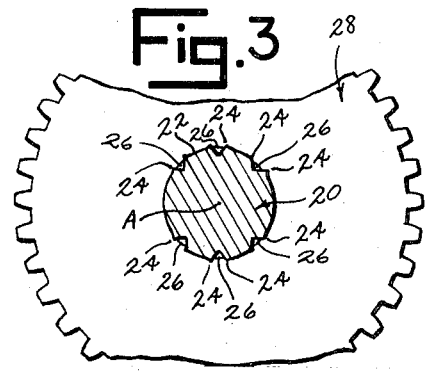

3,872,578

METHOD OF CONNECTING A ROTATING MEMBER TO A SHAFT

SUMMARY OF THE INVENTION

This invention relates to a method of connecting a rotating part to a shaft.

In this invention the shaft is positioned between dies and is compressed diametrically by the dies on opposite sides to impact form a plurality of protruding ridges on each side of the shaft which parallel the shaft axis and which define grooves therebetween. The transverse dimension across the shaft at these ridges exceeds the diameter of a bore formed in a cooperating part, such as an impeller, gear, rotor or similar component, which is to be secured for rotation to the shaft. The shaft and cooperating part are fitted together with the ridges of the shaft lockingly engaging the cooperating part.

By clamping the shaft on opposite sides between the dies during the ridge forming operation, bending and flexing of the shaft is eliminated, and thus unwanted distortion of the shaft along its longitudinal dimension is minimized. The ridges formed upon the shaft are the result of substantial material displacement which allows for a wide fitting tolerance between the shaft and cooperating part. This wide tolerance permits the economical manufacture and assembly of the shaft and cooperating part and would have application in the electric motor and similar precise manufacturing arts.

Accordingly, it is an object of this invention to provide a method of fixedly connecting a rotatable part to a shaft.

Another object of this invention is to provide an economical method of connecting cooperating rotating parts together.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 shows a shaft and cooperating part connected together.

FIG. 2 is an exploded view showing the shaft and cooperating part of FIG. 1 in separated form.

FIG. 3 is a cross sectional view of the shaft taken along line 3—3 of FIG. 1.

FIG. 4 is a perspective view of two dies with the shaft shown in fragmentary form inserted therebetween in preparation for a forming operation.

FIG. 5 is a fragmentary view showing a portion of the dies and shaft in cross section with the dies in their closed position and forming ridges upon the shaft.

FIG. 6 is a fragmentary perspective detailed view showing the die formed ridges upon one side of the shaft.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

As seen in FIGS. 4 and 5, a pair of opposing dies 10 and 12 are provided. Dies 10 and 12 include opposing faces 14 each having a groove 16 formed therein. Grooves 16 are part-circular and include a plurality of parallel V-shaped teeth 18 which extend longitudinally of the groove. In the illustrated embodiment each groove 16 includes three teeth 18 which are spaced approximately 45° apart. Each tooth 18 projects toward a locus axis located an equal radii distance from the part-circular inner face of its groove 16. The included angle between the sides of each tooth 18 is preferably between 60° and 90°.

As shown in the illustrated embodiment, lower die 12 is fixed in position and constitutes an anvil while the upper die 10 is the moving member. Die 10 is shifted between the open position shown in FIG. 4 and the closed position shown in FIG. 5 by means of either a hand-actuated press mechanism, a hydraulic power cylinder, or a similar well known load applying device. Suitable guides (not shown) may be utilized to guide the movement of upper die 10. It is to be further understood that in some applications of this invention each of the dies 10 and 12 may be shiftable toward one another.

A shaft 20 having an outer surface 22 which preferably has the same curvature in cross section as groove faces 16 is inserted between dies 10 and 12 with die 10 in its open position as illustrated in FIG. 4. After shaft 20 is inserted between the open dies, die 10 is forced downwardly causing shaft 20 to be compressed between the dies with die teeth 18 deforming the outer surface 22 of the shaft to displace a substantial amount of the metal thereof which forms a plurality of raised ridges 24 at each side of the shaft. Each pair of ridges 24 preferably parallels the axis A of shaft 20 and defines a groove 26 therebetween. As best seen in FIGS. 3 and 5, there are three grooves 26 formed approximately 45° apart on each side of shaft 20.

A gear 28 is illustrated as the cooperating part which is secured for rotation with shaft 20. Gear 28 includes a bore 30. The diameter of shaft 20 where uninterrupted by ridges 24 is preferably slightly less than the diameter of bore 30 of the gear while the diametrical dimension across opposite ridges 24 on the shaft exceeds the diameter of the gear bore. Gear 28 and shaft 20 are pressed together with ridges 24 interferring with the inner face of gear bore 30 as seen in FIGS. 1 and 3 so as to provide a locking fit between the shaft and the gear.

In the construction above described, shaft 20 may be formed of hardened steel material, with gear 28 being formed of a softer material, such as a cast aluminum alloy, nylon or similar type plastic. Additionally, the working faces of dies 10 and 12 at grooves 16 are formed of a hardened material which enables the ridges 24 and grooves 26 to be pressed into shaft 10.

It is to be understood that the invention is not to be limited to the details above given but may be modified within the scope of the appended claims.

What I claim is:

1. A method of forming a connection between a shaft having a first diameter and an axis and a cooperating part having a bore therein defined by a circular inner face, comprising the steps:

a. providing opposing forming dies with one such die having a part-circular groove therein, said groove being interrupted by a plurality of parallel teeth extending longitudinally of the groove, b. placing said shaft at its first diameter between said dies in alignment with said groove, c. causing said dies to clamp said shaft from diametrically opposite sides with said teeth deforming said shaft and displacing the material thereof to impact form a plurality of protruding ridges on the shaft, said ridges generally paralleling the axis of the shaft and defining grooves in said shaft therebetween, the transverse dimension across said shaft at said ridges exceeding said first shaft diameter and the diameter of said cooperating part bore, and d. fitting said shaft and cooperating part together with the ridges of the shaft lockingly engaging the inner face of said cooperating part bore.

2. The method of claim 1 wherein step (a) includes providing each of said opposing forming dies with a part-circular groove therein interrupted by a plurality of parallel teeth extending longitudinally of the groove, and step (c) includes deforming said shaft with said teeth by displacing the material thereof on opposite sides of said shaft to form a plurality of protruding ridges on the shaft.

3. The method of claim 2 wherein step (c) includes forming six of said protruding ridges at one side and six of said protruding ridges at the opposite side of said shaft.

* * * * *